June 18, 1935.　　　　K. ENDLICH　　　　2,005,703
AUTOMOBILE LICENSE PLATE HOLDER
Filed March 28, 1935　　　2 Sheets-Sheet 1
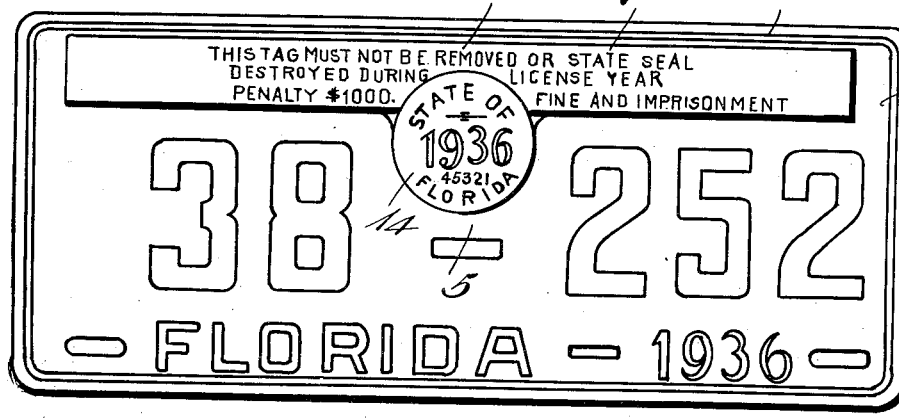
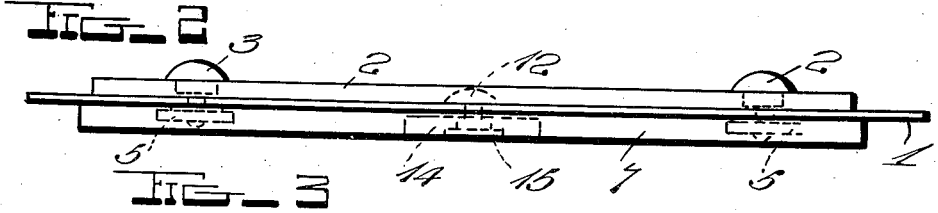
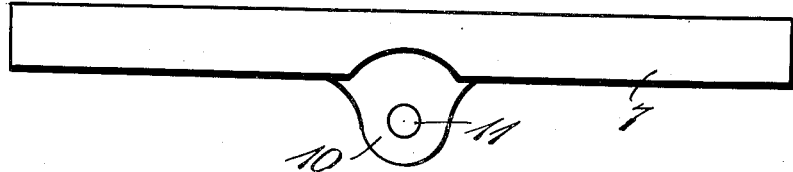
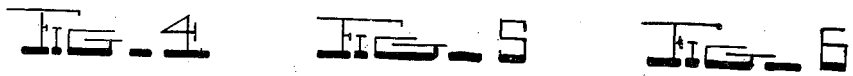
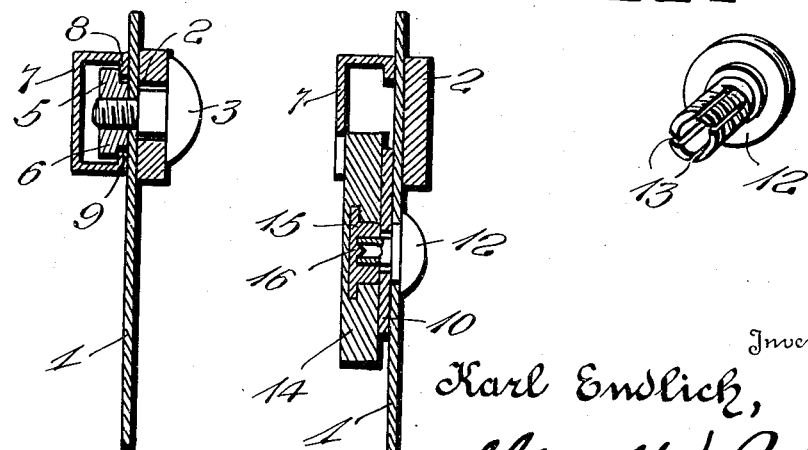
Inventor
Karl Endlich,
By Lloyd W. Patch
his Attorney Patented June 18, 1935

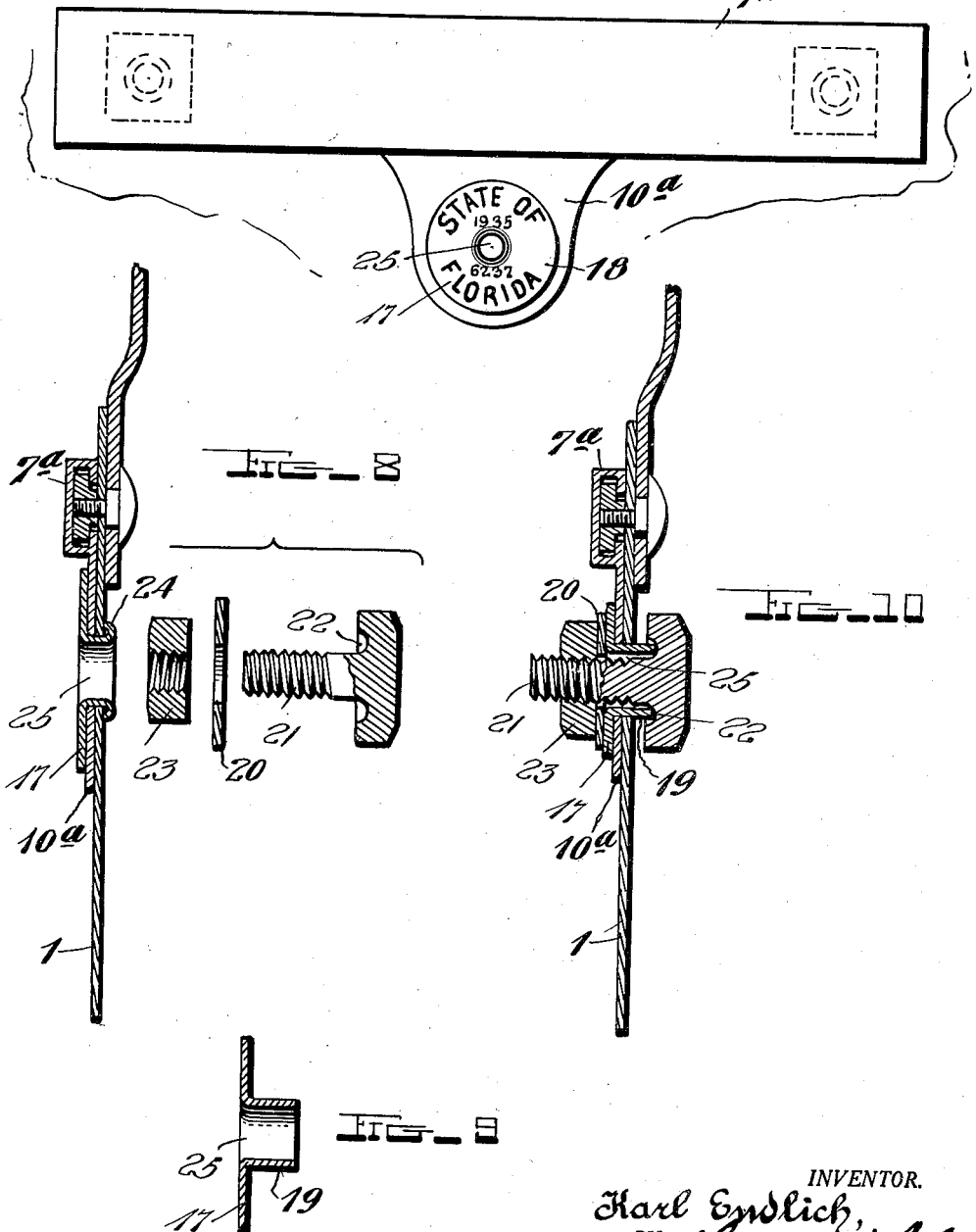

2,005,703

UNITED STATES PATENT OFFICE 2,005,703

AUTOMOBILE LICENSE PLATE HOLDER

Karl Endlich, Miami, Fla., assignor of one-half to William F. A. Buehner, Miami, Fla.

Application March 28, 1935, Serial No. 13,519

7 Claims. (Cl. 40—125)

My invention relates to improvements in automobile license plate holders, and particularly to a device of this character intended and adapted to prevent theft of license plates to be used upon an unauthorized automobile, or other unauthorized interchangement of license plates or tags from one machine to another.

An object of my invention is to provide a device of this character that can be readily used with and applied to license plates or tags as now ordinarily in use, and which will provide a double check to insure the display of the plates or tags only upon the particular automobile or vehicle to which the license extends.

Another object is to so construct the device that an official seal and official check of the mounting of the license plates or tags upon a particular machine will be required, and that any attempt to remove the license tags or plates will necessitate irreplaceable breaking or defacing of the official seal, to thus immediately give visible evidence of any tampering with or attempted improper use of the plates or tags.

Still another purpose is to provide a device of this character which is of simple and inexpensive construction to thus be readily and cheaply employed and applied by properly authorized officials or other persons, and which will guard against accidental or casual displacement of the plates, and which at the same time will discourage unauthorized tampering with or theft of the plates, and will positively preclude the possibility of use upon a vehicle other than that covered by the particular license.

A further object and purpose of my invention is to provide a license plate holder in the form of a seal, which can be applied by a state or municipal officer, or other authorized person, and which is of such character that breaking of the seal or other tampering with the parts will be immediately and unmistakably indicated, the structure being such that once the seal has been broken it cannot be replaced by an unauthorized person.

With the above and other objects in view, which will be apparent to those skilled in the art, my invention includes certain novel features of construction and combinations of parts which will be hereinafter set forth in connection with the drawings and then pointed out in the claims.

In the drawings:

Figure 1 is a view in front elevation showing an automobile license tag with my invention applied thereto.

Fig. 2 is a top plan or edge elevational view of the structure disclosed in Figure 1.

Fig. 3 is a view in elevation showing the locking bar portion.

Fig. 4 is an enlarged fragmentary transverse sectional view through one of the mounting bolts as disclosed in Figure 1.

Fig. 5 is a similar transverse sectional view through the sealing means of Figure 1.

Fig. 6 is a view in perspective of the seal bolt.

Fig. 7 is a fragmentary front view showing parts of a modified construction.

Fig. 8 is a transverse sectional view taken substantially centrally through the modified construction shown in Fig. 7, and illustrating one form of sealing means disassembled.

Fig. 9 is a sectional view through the modified form of seal.

Fig. 10 is a view similar to Fig. 8 showing the sealing means in place as it is assembled for the sealing operation.

My invention is adaptable for use upon and in connection with license plates or tags as now ordinarily displayed upon the front or rear, or upon both front and rear, of automobiles and other vehicles, and in other like connections. In the present instance and illustration, I have shown the license plate or tag 1 as being of ordinary shape, size and construction, and this plate or tag can have numbers, words, or other matter displayed thereon in desired manner. The license plate bracket or holder 2 can be of any form, design and construction. As here disclosed, the license plate 1 and the bracket 2 have registering openings therein, these openings being ordinarily in the form of elongated slots to permit and allow mounting of various tags or plates upon various brackets. The mounting bolts 3 are adapted to be fitted through the aligned openings of the plate 1 and the bracket 2, and are preferably provided with shoulder portions adapted to fit within the elongated slotted openings of the bracket member 2 to thus prevent rotation of the mounting bolts 3. A securing nut 5 is provided to be turned onto the outer end of each mounting bolt 3 to clamp against and rigidly secure the plate or tag 1 in the desired mounting upon the bracket 2, and these clamp nuts 5 can be made of any desired and suitable shape, being perhaps preferably polygonal to permit more ready manipulation and tightening upon the mounting bolts 3. Each clamping nut 5 has a head or flange portion 6 extending laterally adjacent to the outer face thereof to thus provide aligned guideways when the clamp nuts are tightened upon the two mounting bolts 3 to secure the tag or plate 1 in place. These clamp nuts 5 can be manipulated to locate the guideways so that they will be aligned both above and below the mounting bolts, substantially parallel to a line taken centrally through the two mounting bolts as they are fitted to hold the plate in place.

A locking bar 7 is made of elongated form and of a length sufficient to extend substantially across and slightly beyond the two clamp nuts 5 as fitted upon the mounting bolts 3, and this locking bar, which is preferably made channeled, as perhaps best shown in Fig. 4, has flanges 8 and 9 adapted to fit in the aligned guideways of the two clamping nuts as the locking bar is moved endwise to substantially the position shown in Figs. 1 and 2.

As the mounting bolts 3 are locked against being turned and the locking bar 7, when in place, positively precludes accidental or purposeful turning of the clamp nuts 5, the plate or tag 1 is positively clamped and held against removal as long as the locking bar 7 is in this position. With this in mind, it is incumbent that some means be provided to secure the locking bar 7 in place against casual displacement, and to seal the locking bar against unauthorized displacement or removal.

To accomplish the above purpose, I provide an offset tab or ear or other shackle-like portion 10 in the middle of the locking bar 7 and preferably extending downwardly therefrom in close proximity to the face of the license plate or tag 1. The tab or ear 10 has an opening 11 therethrough and the plate 1 is provided with a corresponding opening adapted to register with this opening 11 when the locking bar is in a properly fitted and adjusted position.

A seal bolt 12 is provided to be fitted through the opening 11 and through the registering opening of the plate 1, with its screwthreaded end exposed on the forward side of the plate 1. This exposed threaded end is preferably made of tubular form, and is split longitudinally, as illustrated at 13, in Fig. 6.

A seal 14, preferably of soft metal or other suitable material has a bushing 15 embedded on the inner side thereof, and this bushing 15 is made in the form of a cap nut adapted to receive the split end of the seal bolt 12. This cap nut portion 15 has a re-entrant substantially conical spreader portion 16 in the threaded bore thereof to engage in the split open threaded tubular end of the seal bolt 12, as the seal is turned to tighten the threaded bushing 15 onto the seal bolt, and the end of the seal bolt is thus distorted to bind and grip within the bushing to prevent reverse turning of the seal portion to release the seal bolt. The diagonal formation of the slits 13 in the tubular end of the seal bolt will present sharp spur portions to bite into the metal of the bushing 15 to positively preclude unscrewing of the bushing without destruction of the seal portion.

As is shown, the seal portion can have any desired printed matter thereon, or by the use of a suitable tool the seal portion 14 can be impressed after it has been applied. It is perhaps desirable that a number be displayed, as at 17, upon the seal, so that a check and double record can be made to insure that the authorized seal is associated with the accompanying authorized license plate.

With the modified construction, the locking bar 7 is of substantially the same construction as set forth above, and the tag will be mounted and will be secured in place in substantially the same manner as hereinbefore described. The locking bar 7a is provided with a tab, ear, or shackle-like portion provided with a central opening, substantially similar to the construction of the parts as just described, and the tag 1 is also provided with an opening registering with the opening of the shackle-like portion.

A seal member 17 is provided with a disc like face 18 adapted to have stamped, imprinted or otherwise shown thereon any desired lettering, wording, numbering, or other marking, and this seal member has a tubular shank 19 extending rearwardly and substantially centrally therefrom to be fitted through the registering openings of the shackle-like portion 10a and the opening of the tag 1. A sealing bolt 21 is adapted to be fitted through the tubular shank 19 from the rear, and is provided with a head having a clinching anvil formation at 22. After the bolt 21 has been fitted through the tubular shank a washer 20 is placed thereon over the face 18 of the seal member and a clamping nut 23 is turned upon the sealing bolt 21 to cause the end of the tubular shank 19 to be forced into and be rolled out by the formation of the groove 22. In this way, the end of the shank 19 is turned over and is rolled down against the rear side of the tag 1, as shown at 24, to thus secure and hold the seal member in place, while leaving a central opening 25.

The face 18 of the seal member 17 has matter thereon to distinguish the particular locality where the tag was affixed, the date or time of sealing, or other matter which it may be desired to display, and as the seal can be removed only by breaking or destroying the tubular shank 19, it is impossible to reaffix the seal to an unauthorized license plate or tag. If any attempt be made by an unauthorized person to apply the seal by means of a rivet, screw, bolt, or other fastening within the remnants of the broken shank 19, these can be immediately detected for the reason that the opening 25 will be closed or obscured.

It is of course to be understood that following the affixing and securement of the seal, the bolt 21 and its associated parts will be removed.

From the foregoing it will be seen that I have provided an automobile license plate holder adaptable and suitable for use upon license plates as now ordinarily in use, and which will render to the various state, municipal, or other governmental bodies, a means and method of conveniently and readily assuring that license plates will be used only upon the particular vehicle with which their use is authorized. As is illustrated in Figure 1, any desired warning or penalty notice can be readily shown upon the face of the locking bar 7, to thus be conveniently visible, and an added protection is thus afforded to the public and to the individual vehicle owner, as such penalty or warning will deter unauthorized parties from tampering with or removing the license plates from the particular vehicle authorized and licensed to use the plates.

While I have herein shown and described only certain specific embodiments of my invention, it will be appreciated that changes and variations can be made in the form, construction, assembly, association, and manner of use of the various parts, without departing from the spirit and scope of my invention.

I claim:

1. In combination with a license plate having openings and a mounting bracket therefor having openings, mounting bolts fitted through the openings of the bracket and plate, clamp nuts fitted on said mounting bolts and provided with guideway portions, a locking bar provided with flange portions received in the guideway portions of the clamp nuts to retain the same against removal from the mounting bolts, and seal means engaging the locking bar and the license plate to prevent unauthorized removal of the locking bar.

2. In combination with a license plate having openings and a mounting bracket therefor having openings, mounting bolts fitted through the openings of the bracket and plate, clamp nuts fitted on said mounting bolts and provided with guideway portions, a locking bar provided with flange portions received in the guideway portions of the clamp nuts to retain the same against removal from the mounting bolts, said license plate and the locking bar being provided with openings registering when the locking bar is in position to retain the clamp nuts in place, and seal means applied in the registering openings to retain the locking bar against unauthorized removal.

3. In combination with a license plate having openings and a mounting bracket therefor having openings, mounting bolts fitted through the openings of the bracket and plate, clamp nuts fitted on said mounting bolts and provided with guideway portions, a locking bar provided with flange portions received in the guideway portions of the clamp nuts to retain the same against removal from the mounting bolts, said license plate and the locking bar being provided with openings registering when the locking bar is in position to retain the clamp nuts in place, a split seal bolt fitted through the registering openings of the plate and the locking bar, and a destructible seal member fitted and locked upon the split seal bolt to positively secure the locking bar against removal except by destruction of the seal member.

4. In combination with a license plate having an opening and a mounting bracket therefor having an opening, a mounting bolt fitted through the openings of the bracket and plate, a clamp nut fitted on said mounting bolt and provided with guideway portions, a locking bar provided with flange portions received in the guideway portions of the clamp nut to retain the same against removal from the mounting bolt, and seal means engaging the locking bar and the license plate to prevent unauthorized removal of the locking bar.

5. In combination, a bracket having a fastener receiving opening, a license plate provided with a fastener receiving opening and having a second opening therethrough, a bolt fitted through the fastener receiving openings of the bracket and plate, a nut on said bolt, a locking bar fitted to prevent removal of said nut and provided with an opening registering with said second opening, and seal means secured through said registering openings to secure the locking bar in place.

6. In combination, a bracket having a fastener receiving opening therethrough, a license plate provided with a fastener receiving opening therethrough and having a second opening, a bolt fitted through the fastener receiving openings of the bracket and plate, a nut on said bolt, a locking bar provided with a flange portion fitted and held upon said nut and having an opening registering with the said second opening through the plate, and seal means mounted through said registering openings to secure the locking bar in place and consequently hold the nut against removal.

7. In combination, a mounting bracket having a bolt receiving opening therethrough, a bolt fitted through said opening, a license plate having an opening through which the bolt fits and provided with a second opening, a nut turned onto said bolt to hold the plate in place, a locking bar having a flange portion received and held upon the nut and provided with an opening registering with the second opening in the plate when the locking bar is in place, and seal means mounted through the registering openings to secure the locking bar against movement and to consequently retain the nut against being turned from the bolt.

KARL ENDLICH.